UNITED STATES PATENT OFFICE.

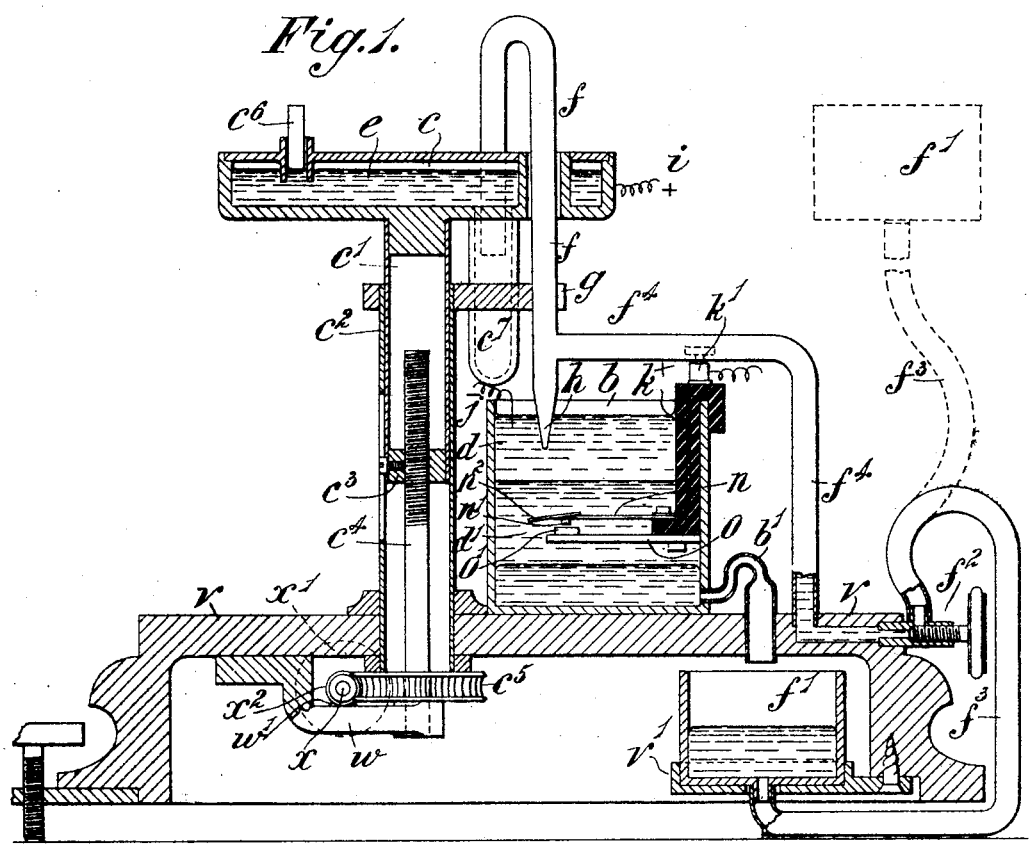

JAMES TARBOTTON ARMSTRONG AND AXEL ORLING, OF LONDON, ENGLAND.

ELECTROCAPILLARY APPARATUS.

No. 798,481. Specification of Letters Patent. Patented Aug. 29, 1905.

Original application filed May 19, 1902, Serial No. 108,139. Divided and this application filed February 2, 1904. Serial No. 191,674.

*To all whom it may concern:*

Be it known that we, JAMES TARBOTTON ARMSTRONG, a subject of the King of England, and AXEL ORLING, a subject of the King of Sweden and Norway, both residing at London, England, have invented new and useful Improvements in Electrocapillary Apparatus, of which the following is a specification.

Our invention relates to apparatus employed to detect the presence of electrical currents, and has for its object improvements whereby extremely weak currents may be detected and caused to actuate other apparatus or mechanisms directly or through one or more relays.

In carrying out our invention we make use of the electrocapillary force exerted at the surfaces in contact of certain dissimilar fluid conductors (such as mercury and dilute acid or a solution of spirits of wine and potassium iodid) when an electric current flows through one to the other. This force brings about a displacement of the said fluids, which effect we employ to start the action of a siphon or to disturb the balance of a delicately-poised part of the apparatus, by means of either of which or a combination of both a relay-circuit may be closed. The normal condition of the apparatus is one of equipoise, and the effect of the electrocapillary force is to disturb the equilibrium. It is therefore manifest that the displacement which always accompanies the passage of even the weakest currents must vary the distribution of weight and cause a preponderance on one side that will effectually operate the apparatus.

According to our invention the fluid conductors are in some cases contained by separate receptacles, which communicate with each other through a tube or other suitable channel, or alternately we employ a tube or an equivalent part of suitable form alone, as is hereinafter particularly described with reference to the accompanying drawings, in which—

Figure 1 shows one form of our invention in vertical section, diagrammatically. Fig. 2 is a detail thereof, and Fig. 3 illustrates a modification hereinafter referred to.

According to one form of our invention (shown in Fig. 1) we employ a chamber $c$, which is supported by a stem $c'$ and adapted to slide in a tubular post $c^2$ in order that the level of the mercury $e$ contained by it may be adjusted relatively to the siphon $f$, which is held stationary by its holder $g$, secured to the tubular post $c^2$. The stem $c'$ is provided at its lower extremity with a nut $c^3$, which is engaged by a screw-threaded rod $c^4$, located within the tubular post $c^2$. The lower end of the screw-threaded rod $c^4$ passes through the base $v$ of the apparatus, where it is provided with a worm-wheel $c^5$ and is journaled in a bracket $w$. This bracket is provided with a lug $w'$, in which is journaled a shaft $x$, that extends through the base to the outside, where it has a milled head $x'$. At its inner end this shaft is provided with a worm $x^2$, which engages the wheel $c^5$, through which the rod $c^4$ may be rotated and the chamber $c$ raised or lowered. The chamber $c$ is provided with a float $c^6$ to indicate the level of the mercury and a deep pocket $c^7$, into which the short leg of the siphon $f$ dips. The chamber $b$ is provided with a heavy non-conducting fluid $d'$, such as carbolic acid, above which floats a lighter conducting fluid $d$, such as a solution of spirits of wine and potassium iodid, into which dips the constricted end $h$ of the long leg of the siphon $f$. Normally the capillary force at the constricted end $h$ of the siphon $f$ prevents the mercury flowing from the chamber $c$ into the other chamber $b$. When, however, a current passes through the contacting surfaces of the fluid conductors $d$ and $e$ in the direction from $e$ to $d$ or when a corresponding potential difference is established at the terminals of the apparatus, the capillary force is reduced and the mercury $e$ is permitted to flow. Beneath this siphon and immersed in the non-conducting fluid $d'$ are located the relay-contacts $n$ and $o$, which extend from a piece of insulating material $k^\times$, removably attached to one of the walls of the chamber $b$. This part $k^\times$, which is shown in plan in Fig. 2, is provided with binding-posts $k'$ and has holes through which connections extend to the contacts $n$ and $o$, respectively. The contact $n$ is preferably composed of a strip of platinum provided with a hammer $n'$ of the same material, which is adapted to make contact with a carbon anvil $o'$, supported by the other terminal $o$. At the end of the contact $n$ an inclined plate $n^2$, of mica or other suitable material, is located, upon which the mercury delivered by the siphon falls, and thereby closes the relay-circuit, whereafter the mercury rolls off and sinks to the bottom of the chamber, whence it flows through the overflow-pipe $b'$ to a cup $f'$, supported upon a pivoted shelf $v'$ beneath the base $v$. From this cup the mercury may be returned to the chamber $c$ by raising the cup, as shown by dotted lines, and opening the valve $f^2$, when the mercury will flow through the flexible tube $f^3$, valve $f^2$, tube $f^4$ to the siphon $f$, whence most of it will pass upward and into the said chamber $c$.

In Fig. 3 is shown a modification of the arrangement last described, according to which the apparatus is adapted for use with a coherer-circuit of any well-known kind. The coherer A is located in the non-conducting fluid $d'$ between spring-fingers A' and A², to which its terminals are respectively connected. The upper of these fingers A' is provided with a downwardly-inclined portion A³, upon which the mercury that is delivered by the siphon $f$ falls after it leaves the plate $n^2$ of the relay-closing device. In this way the coherer is vibrated and decoherence effected without the employment of an electromagnet, whereby local disturbances are obviated. In this arrangement one of the fingers is connected to an aerial conductor B, and the other is led to earth E, while the relay and its battery are contained in a circuit C, which is completed through the coherer. In this circuit the positive pole of the battery is connected with the mercury in the siphon, through which it flows to the other fluid conductor $d$, whence the current flows through the conductor C to complete the circuit.

It is obvious that we may employ two or more siphons or the equivalent capillary element in order that a larger quantity of mercury may be delivered when a current passes through the apparatus.

What we claim as our invention, and desire to secure by Letters Patent, is—

1. In a relay-closing device, the combination of a body of heavy non-conducting fluid with a body of relatively light conducting fluid resting thereon, means actuated by electrocapillary action of delivering mercury into the lighter fluid and relay-contacts located in the heavier fluid and actuated by the falling mercury, substantially as described.

2. In electrocapillary apparatus, a fluid-conducting tube in combination with a receptacle for mercury receiving one end of the said conducting-tube, a receptacle for carbolic acid or other suitable heavy non-conducting fluid and a solution of spirits of wine and potassium iodid or other suitable liquid electric conductor receiving the other end of the said fluid-conducting tube, conductors forming part of an electric circuit and arranged to direct an electric current through the mercury to the other liquid conductor to produce an electrocapillary flow of the mercury and relay-contacts located in the heavy non-conducting fluid beneath the delivery end of the fluid-conducting tube and adapted to be actuated by the falling mercury, substantially as and for the purpose set forth.

3. In electrocapillary apparatus, a fluid-conducting tube in combination with a receptacle for mercury receiving one end of the said conducting-tube, a receptacle for carbolic acid or other suitable heavy non-conducting fluid and a solution of spirits of wine and potassium iodid or other suitable liquid electrical conductor receiving the other end of the said fluid-conducting tube, conductors forming part of an electric circuit and arranged to direct an electric current through the mercury to the other liquid conductor to produce an electrocapillary flow of the mercury, relay-contacts located in the heavy non-conducting fluid beneath the delivery end of the fluid-conducting tube and adapted to be actuated by the falling mercury, and a coherer forming part of the electric circuit including the electrocapillary element and located beneath the relay-contacts so as to be agitated and decohered by the falling mercury after it leaves the relay-contacts, substantially as and for the purpose set forth.

4. In electrocapillary apparatus, a fluid-conducting tube of siphon form in combination with a receptacle for mercury receiving one of the legs of the said fluid-conducting tube and provided with a stem adapted to slide in a vertical guide, a receptacle for carbolic acid or other suitable heavy non-conducting fluid and a solution of spirits of wine and potassium iodid or other suitable liquid electric conductor receiving the other leg of the said fluid-conducting tube, conductors forming part of an electric circuit and arranged to direct an electric current through the mercury to the other liquid conductor to produce an electrocapillary flow of the mercury, and relay-contacts located in the heavy non-conducting fluid beneath the delivery end of the fluid-conducting tube and adapted to be actuated by the falling mercury, substantially as and for the purpose set forth.

5. In electrocapillary apparatus, the combination of a body of relatively light fluid and a body of heavier non-conducting fluid on which it rests, with means for containing the same, a pair of contacts forming part of an electric circuit and arranged one above the other, a tube containing a still heavier conducting fluid and having its discharging end arranged above the upper contact and immersed in the first-mentioned and lightest fluid and means for sending an electric current through the said tube and the said lightest fluid, for changing their electrocapillary condition and permitting the discharge of fluid from the said tube substantially as set forth.

6. In electrocapillary apparatus, a mercury-receptacle provided with a vertically-adjustable stem and a tubular pocket in combination with a siphon-tube having its shorter end arranged to dip into said pocket and means for supporting the said siphon independently of the said pocket substantially as set forth.

7. In electrocapillary apparatus, a mercury-receptacle C in combination with a siphon-tube dipping at one end into the same and having a branch tube $f^4$, a valve controlling this branch tube, a removable receptacle $f'$ for the mercury discharged by the said siphon-tube and a flexible tube connecting receptacle $f'$ to the said branch tube, in order that it may be raised at will to a higher level than the mercury-receptacle C and the said valve opened, permitting the mercury to flow back into receptacle C substantially as set forth.

8. A pair of electrical contacts forming part of an electric circuit and arranged slightly apart in non-conducting fluid, in combination with a mercury-tube arranged with its discharge end above the same and immersed in a lighter conducting fluid and means for sending an electric current through the said conducting fluids to change their electrocapillary condition and permit the discharge of the mercury substantially as set forth.

In testimony whereof we have signed our names to this specification in the presence of two subscribing witnesses.

JAMES TARBOTTON ARMSTRONG.
AXEL ORLING.

Witnesses:
W. H. WOOD,
E. A. GODDIN.